United States Patent
Voelker et al.

(10) Patent No.: US 12,169,235 B2
(45) Date of Patent: Dec. 17, 2024

(54) MULTIPLE RESOLUTION RADAR

(71) Applicant: Airbus Defence and Space GmbH, Taufkirchen (DE)

(72) Inventors: Michael Voelker, Taufkirchen (DE); Jung-Hyo Kim, Taufkirchen (DE); Friedhelm Rostan, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 353 days.

(21) Appl. No.: 17/676,499

(22) Filed: Feb. 21, 2022

(65) Prior Publication Data
US 2022/0276376 A1 Sep. 1, 2022

(51) Int. Cl.
*G01S 13/90* (2006.01)
(52) U.S. Cl.
CPC ...... *G01S 13/9027* (2019.05); *G01S 13/9029* (2013.01); *G01S 13/9076* (2019.05)
(58) Field of Classification Search
CPC ............. G01S 13/9027; G01S 13/9029; G01S 13/9056; G01S 13/9076
See application file for complete search history.

(56) References Cited

U.S. PATENT DOCUMENTS

| | | | |
|---|---|---|---|
| 2014/0266899 A1* | 9/2014 | Torre | G01S 13/02 342/371 |
| 2020/0142056 A1* | 5/2020 | Fox | G01S 13/9056 |

FOREIGN PATENT DOCUMENTS

| | | | | |
|---|---|---|---|---|
| WO | WO-2018217815 A1 | * | 11/2018 | ............ G01S 13/24 |
| WO | WO-2019226194 A2 | * | 11/2019 | ......... G01S 13/9052 |
| WO | WO-2020208579 A1 | * | 10/2020 | ........... G01S 13/904 |

OTHER PUBLICATIONS

Jerome Colinas et al.: "Radarsat Constellation, moving toward implementation", Geoscience and Remote Sensing Symposium, pp. 3232-3235, Jul. 25, 2010.
Alan A. Thompson et al.: "Innovative Capabilities of the RADARSAT Constellation Mission", 8th European Conference on Synthetic Aperture Radar, Jun. 10, 2010.
A. Fourmault et al.: "RCM SAR antenna capabilities", International Symposium on Antenna Technology and Applied Electromagnetics and the American Electromagnetics Conference, pp. 1-4, Jul. 5, 2010.

(Continued)

*Primary Examiner* — Timothy X Pham
(74) *Attorney, Agent, or Firm* — Williams Mullen; Thomas F. Bergert (57) ABSTRACT

A method for operating a synthetic aperture radar, SAR, mode, in an SAR instrument, wherein the method comprises the steps of: acquiring at least one subswath positioned in an across track direction of a movement of the SAR instrument, wherein the at least one subswath is acquired during at least one acquisition burst duration and/or at a predetermined radio frequency bandwidth; adjusting the at least one acquisition burst duration and/or the predetermined radio frequency bandwidth and/or a number of parallel simultaneous subswaths and/or an inserted burst duration for a further subswath based upon a predetermined parameter; constructing an SAR image based on the acquired at least one subswath.

19 Claims, 6 Drawing Sheets

(56) References Cited

OTHER PUBLICATIONS

Gerhard Krieger et al.: "Multidimensional Waveform Encoding: A New Digital Beamforming Technique for Synthetic Aperture Radar Remote Sensing", IEEE Transactions on Geoscience and Remote Sensing, vol. 46, No. 1, pp. 31-46, Jan. 1, 2008.
Partial European Search Report, European Patent Application No. 21159791.9, Jul. 30, 2021.
European Search Report, European Patent Application No. 21159791.9, Nov. 2, 2021.
M. Suess et al.: "TERRASAR-X—Design and Performance", EUSAR 2002, Cologne, Germany, Jun. 4-6, 2002.
Malcolm W.J. Davidson et al.: "ESA Sentinel-1 SAR Mission Concept", EUSAR 2006, Dresden, May 16-18, 2006.
Francesco De Zan: "Terrain Observation with Progressive Scan", EUSAR 2006, Dresden, May 16-18, 2006.
Francesco De Zan: "Spaceborne DINSAR monitoring with weekly revisit time with TOPSAR", EUSAR 2006, Dresden, May 16-18, 2006.
European Space Agency, "Sentinel-1—ESA's Radar Observatory Mission for GMES Operational Services", https://sentinel.esa.int/documents/247904/349449/S1_SP-1322_1.pdf, p. 27, 2012.
M. Suess et al.: "A Novel High Resolution, Wide Swath SAR System", IGARSS 2001, Sidney, Australia, Jul. 13-19, 2001.
ESA Copernicus Space Component Mission Management Team, "Sentinel High Level Operations Plan (HLOP)", Reference COPE-S1OP-EOPG-PL-15-0020, Issue 3, Revision 0, Jul. 22, 2019.
Federica Bordoni et al.: "Beam-Switch Wide-Swath Mode for Interferometrically Compatible Single-Pol and Quad-Pol SAR Products", 18th International Radar Symposium (IRS), Jun. 28-30, 2017.
Michelangelo Villano et al.: "Simultaneous Single-/Dual- and Quad-Pol SAR Imaging over Swaths of Different Widths" IEEE Transactions on Geoscience and Remote Sensing, German Aerospace Center (DLR), PP(99):1-8, Dec. 2019.

\* cited by examiner

MULTIPLE RESOLUTION RADAR

CROSS-REFERENCE TO RELATED APPLICATIONS

The present application claims the benefit under 35 U.S.C. 119 of European Patent Application No, 21159791.9 filed on Feb. 26, 2021.

FIELD OF THE INVENTION

The present invention relates to a method for operating a synthetic aperture radar mode in a SAR instrument and to the SAR instrument. The method is achieved by acquiring at least one subswath during a burst duration/at a radio frequency is bandwidth, and adjusting a burst duration/radio frequency bandwidth according to a parameter.

BACKGROUND TO THE INVENTION

The TerraSAR-X and Sentinel-1 SAR modes that can be used within an operational scenario either provide large swaths with coarse spatial using ScanSAR, or similarly designed TOPS mode, or alternatively narrow fine resolution with stripmap, sliding spot or staring spot mode. High Resolution Wide Swath, HRWS, SAR systems acquire both. The HRWS system is used for a wide range of applications but needs a high amount of resources such as power and memory and high sensitivity still requires high RF power otherwise the spatial resolution can be coarsened for achieving high signal to noise ratio. Increasing the number of sensors is a straight forward solution for improving the coverage. This however increases the cost for delivery of the space segment and ground operation for data downlink infrastructure, data processing, collision avoidance commanding and disposal of the space segment.

There is therefore a need for an SAR mode which can apportion and balance spatial and radiometric resolutions while reducing resource usage.

SUMMARY OF THE INVENTION

The invention is set out in the independent claims. Preferred embodiments of the invention are set out in the dependent claims.

The invention described below may allow for an instrument design that fits into boundary conditions like cost, size, mass and risks which may be mission dependent. It may also allow for swaths to be found with dominant requirement towards swath width, resolution, sensitivity and/or polarization based on the requirements of the mission, Total burst cycle time may be allocated for individually assigning along track integration length derived spatial resolutions. This may allow for a provision of a total swath with moderate spatial resolution using up moderate time of burst cycle time that increases the acquired swath width which may in general result in an improved temporal resolution while other subswaths with increased burst duration allow for improved spatial resolution and/or sensitivity, Pieces with high spatial resolution may therefore be acquired simultaneously within wide swaths.

The invention may reduce mission operations concept complexity due to using only one SAR mode.

According to a first aspect, we describe a method for operating a synthetic aperture radar, SAR, mode, in an SAR instrument. The method comprises acquiring at least one subswath positioned in an across track direction of a movement of the SAR instrument, wherein the at least one subswath is acquired during at least one acquisition burst duration and/or at a predetermined radio frequency bandwidth. The method further comprises adjusting the at least one acquisition burst duration and/or the predetermined radio frequency bandwidth and/or a number of parallel simultaneous subswaths and/or an inserted burst duration for a further subswath based upon a predetermined parameter. The method further comprises constructing an SAR image based on the acquired at least one subswath.

The SAR instrument may be airborne or spaceborne. In other words, the SAR instrument may be an airborne SAR instrument or a spaceborne SAR instrument. The acquisition of the at least one subswath may allow for the SAR instrument to scan a section of the ground. The SAR instrument is preferably airborne over Earth but may be airborne, or spaceborne, over any celestial body. The subswath may be a part of a larger swath comprising any suitable number of subswaths. The at least one subswath is acquired during the at least one acquisition burst duration. In some examples, each subswath is acquired during a respective burst duration. Alternatively, multiple subswaths may be acquired during a burst duration. The burst duration may be one of a plurality of burst durations which make up a burst cycle. The radio frequency bandwidth may be any suitable radio frequency bandwidth.

The at least one acquisition burst duration and/or the radio frequency bandwidth and/or number of parallel simultaneous subswaths and/or inserted burst duration for a further subswath may be adjusted according to a parameter which is described in more detail below.

In some examples, the parallel simultaneous subswaths can be acquired by simultaneous illumination in transmit mode of the SAR instrument and multiple beams acquired in parallel in receive mode of the SAR instrument and/or pulse to pulse change of beam direction. This may result in a wider swath area as the burst cycle length can remain the same while more subswaths are acquired. In some examples, any number of subswaths can be simultaneously acquired.

In some examples, a subswath can be acquired with an adapted along track dimension to completely cover the beam traveling distance on the ground for closing burst to burst gaps or with increased or decreased along track size and/or position for providing a spotlight acquisition. This may allow for a more customizable acquisition of subswaths according to the mission requirements of the SAR instrument.

The construction of SAR images is known to the person skilled in the art. The construction of the SAR images may be achieved by known SAR modes such as StripMap, staring spot, sliding spot, ScanSAR, TOPS or any other suitable SAR mode.

In some examples, the predetermined parameter is a subswath geometry which may allow for the acquisition of a temporal resolution and/or a spatial resolution and/or a radiometric resolution and/or a noise equivalent sigma zero, NESZ, and/or a polarization. In some examples, the subswath geometry may be the geometry of the entire swath.

Spatial resolution $res_{rg}$ across track may be dependent on RF bandwidth, $B_{Tx}$ and angle of incidence $\theta$ and may be defined as:

$$res_{rg} = k_{rg} \frac{c}{2B_{Tx}\sin(\theta)}$$

wherein $k_{rg}$ is a number close to 1 that may be dependent on (spectral) processing parameters and c is the speed of light.

The spatial resolution $res_{az}$ along track may be dependent on integration time $T_{integr}$ of a target. For a ScanSAR/staring spotlight mode this may be equal to the burst duration $T_{burst\_t}$/total image acquisition time:

$$res_{as} = k_{as}\lambda \frac{R}{2T_{integr}v_{SC}}$$

The relevant spatial resolution area $res_{area}$ may be dependent on RF bandwidth $B_{Tx}$, and integration time $T_{integr}$ (burst duration $T_{burst\_t}$) available for integrating a target (integration time) within burst number i:

$$res_{area} = k_{rg}k_{az}\frac{c}{2B_{Tx}\sin(\theta)}\lambda\frac{R}{2T_{integr}v_{SC}}$$

Throughout the present application the total burst cycle duration may be defined as the sum of all N burst durations illuminating one or more subswaths each including acquisition gaps—e. g. due to pulse traveling time:

$$T_{burst\,cycle} = \sum_{i=1}^{N} T_{burst,i} + T_{gap,i}$$

The radiometric resolution may be defined as:

$$1 + \frac{1+\frac{\sigma^0}{NESZ}}{\sqrt{N_{looks}}}$$

wherein $\sigma^0$ is the backscatter of the surface and wherein $N_{looks}$ is the number of looks taken by the SAR instrument. NESZ may be defined as:

$$NESZ = 2(4\pi)^3 \frac{k_B}{\lambda^3} \frac{TNFL}{P_{avg}G_{Tx}G_{Rx}} \frac{R^3 v_{SC}}{\frac{c}{2B_{Tx}\sin(\theta)}}$$

wherein:
$\pi$, $k_B$, c are constant pi, Botzmann constant, speed of light
$\lambda$ is RADAR wavelength used
T, NF, L are Instrument Noise Reference Temperature, Noise Figure and Losses
$P_{avg}G_{Tx}G_{Rx}$ are Average RF power transmitted, Antenna Gain in transmit (Tx) and receive (Rx)
R is slant range being the signal travel distance from the Radar to the surface acquired
$v_{SC}$ is velocity of the SAR antenna—e.g. the orbit velocity of the spacecraft Average RF power transmitted may be a resources driving capability of the instrument. In any case, instrument contribution to Noise Figure and Losses may be subject to optimization within instrument design.

Antenna Gain may be dependent on (resources driving) instrument capability such as aperture type, dimension and DBF capabilities, and on SAR mode design parameters.

Velocity, slant range and incidence may be dependent on the general geometry parameter selected.

Given the outer geometry, transmitted power and antenna gain, the balancing between NESZ and spatial across track resolution $res_{rg}$ may be commandable via the transmitted bandwidth:

$$NESZ \cdot res_{rg} = k_{rg}2(4\pi)^3 \frac{k_B}{\lambda^3} \frac{TNFL}{P_{avg}G_{Tx}G_{Rx}} R^3 v_{SC}$$

The spatial resolution may be the imaged area of a point target acquired such as RADAR backscatter or any other suitable point target. The radiometric resolution may be the ability for an instrument to discriminate between two objects that have similar radar cross sections. The NESZ may be a metric which quantifies the effect of system noise on image quality. The polarization may allow for the instrument to identify structure, orientation and environmental conditions of elements on the ground.

Temporal resolution may be defined as the frequency of the reacquisition of a same target area.

Acquisition polarization may comprise of transmit and receive polarization combinations. Examples of polarization may be linear, H (horizontal) and V (vertical) or L (circular left) and R (circular right) depicting transmit and receive combinations being one or up to four out of HH, HV, VH and VV. Other polarizations or combinations of polarizations may also be depicted.

In some examples, the method further comprises adjusting the radio frequency bandwidth selected for the acquisition of the at least one subswath, wherein the adjustment is configured to adjust the spatial resolution and/or the NESZ of the constructed SAR image. These two resolutions may be balanced by increasing or decreasing the bandwidth.

In some examples, the method further comprises adjusting the radio frequency bandwidth during acquisition of the at least one subswath, wherein the adjustment s configured to after the spatial resolution and/or the NESZ of the constructed SAR image.

In some examples, the method further comprises simultaneously acquiring a plurality of subswaths. This may be achieved by pulse repointing and/or simultaneously receiving multiple beams at the same time. This may allow for a larger swath geometry as more subswaths can be acquired during a single burst cycle as acquisition burst durations can be simultaneous. It may also allow for the along spatial resolution of the plurality of subswaths to be maintained during the simultaneous acquiring. It may also allow for the constructed SAR image to be further adjusted based on the mission requirements.

In some examples, the plurality of subswaths are acquired by Beam Switch Wide Swath, BSWS, and/or digital beamforming, DBF. In some examples, the plurality of subswaths are acquired by Beam Switch Wide Swath, BSWS, with or without digital beamforming, DBF. The usage of DBF may allow for an improved swath width acquisition, and improved spatial resolution and NESZ performances. The usage of BSWS may allow for the sharing of RF power between subswaths. This may result in a reduction of the NESZ but an increase in the swath geometry, Additionally or alternatively, simultaneous acquisition of the plurality of subswaths may be achieved by acquiring a plurality of antenna beam directions.

In some examples, the digital beamforming, DBF, comprises multiple receive sub-apertures in azimuth, MAPS, and/or coherent summation of signals from the sub-apertures in one column into one single signal, ScoRe.

The use of MAPS may allow for an improved instantaneous Doppler and therefore swath length acquired during a burst which improves, i.e. increases, the available burst cycle duration.

The use of ScoRe may allow for an improved NESZ performance due to the maximizing of the receive antenna gain.

In some examples, the method further comprises acquiring a plurality of subswaths simultaneously by changing an antenna beam direction of the SAR instrument between a first pulse of the SAR instrument and a second pulse of the SAR instrument and/or transmit in the plurality of subswaths simultaneously. The time between pulses of the antenna beam may be referred to as a pulse repetition interval (PRI), This may allow for a wider coverage of the ground i.e. an additional (sub)swath.

In some examples, the method further comprises simultaneously acquiring a plurality of the plurality of subswaths by using a plurality of SAR instrument antenna beams. This may allow for a larger swath geometry as multiple subswaths can be acquired at once during a burst cycle.

In some examples, the method further comprises adjusting the at least one acquisition burst duration and/or the radio frequency bandwidth of the SAR instrument during acquisition of the at least one subswath, wherein the adjustment is configured to alter the NESZ of the constructed SAR image. This may allow for the sensitivity of the constructed SAR image to be increased or decreased based on the mission requirements. In some examples, adapting the at least one acquisition burst duration may lead to at least one other burst duration being adapted so that the burst cycle time remains substantially constant.

In some examples, the method further comprises adjusting an average ground velocity of the acquisition of the at least one subswath. This may allow for a reduction or an increase in the pure zero Doppler pointing velocity of the antenna beam. A reduction in this Doppler pointing velocity may lead to an improved spatial resolution and/or a larger (sub)swath acquisition area.

In some examples, the method further comprises roll steering the SAR instrument. This may allow for the antenna beam to be pointed towards the ground and/or at particular specific points and/or allow for a large access range across thereby leading to an improved ground surface illumination with the antenna beam. If the SAR instrument is a spaceborne SAR instrument, roll steering may be achieved by rolling the spacecraft to which the SAR instrument is coupled.

In some examples, the method further comprises adjusting an along track interferometric, ATI, ground moving target indication, GMTI, mode of the SAR instrument, wherein the adjustment is configured to alter the polarization of the at least one acquired subswath. This may allow for an improved identification of structure, orientation and environmental conditions of elements on the ground.

In some examples, the at least one subswath is acquired in ATI, GMTI mode and/or a single channel, dual or quad polarization and/or vessel detection mode.

In some examples, the SAR instrument comprises a processing unit, and wherein the processing unit comprises a computer program suitable to execute the method. This may allow for the method to be executed on any suitable structure that can comprise an SAR instrument.

According to a second aspect, we describe a SAR instrument. The SAR instrument comprises an acquisition unit configured to acquire at least one subswath positioned in an across track direction of a movement of the SAR instrument, wherein the at least one subswath is acquired during at least one acquisition burst duration and/or at a predetermined radio frequency bandwidth. The SAR instrument further comprises a processing unit configured to adjust the at least one acquisition burst duration and/or the predetermined radio frequency bandwidth and/or a number of parallel simultaneous subswaths and/or an inserted burst duration for a further subswath based upon a predetermined parameter and construct an SAR image based on the acquired at least one subswath.

In some examples, the SAR instrument or the acquisition unit of the SAR instrument further comprises a planar phased array antenna and/or a reflect array and/or a reflector and/or a horn antenna structure. This may allow for the SAR instrument to receive image data and/or signals from the ground and/or transmit image data and/or signals to the ground.

If the SAR instrument is a spaceborne instrument, a global acquisition approach may be defined. An along orbit position dependent mechanical antenna pointing gives advantage for maximizing the coverage performance. An example operational scenario may be based on a sun synchronous orbit with right looking antenna, A pointing law can parametrize the mechanical pointing of the satellite which includes the SAR antenna towards steep incidence close to the south pole and continuously change the roll angle towards shallow incidence close to the north pole. This may allow for latitudes covered from north pole down to close to the south pole. The mechanical roll may allow for an increase of access range without the need of excessive antenna scan angular range.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors), For example, the processing unit may be implemented at least partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

It is further clear to the person skilled in the art that even if the herein-described details will be described in terms of a method, these details may also be implemented or realized in a suitable device, an RF unit, a computer processor or a memory connected to a processor, wherein the memory can be provided with one or more programs that perform the method, when executed by the processor. Therefore, methods like swapping and paging can be deployed.

Even if some of the aspects described above have been described in reference to the arrangement, these aspects may also apply to the method and vice versa.

BRIEF DESCRIPTION OF THE DRAWINGS

These and other aspects of the invention Will now be further described, by way of example only, with reference to the accompanying figures, wherein like reference numerals refer to like parts, and in which.

DETAILED DESCRIPTION OF THE PREFERRED EMBODIMENTS

Figure 1:
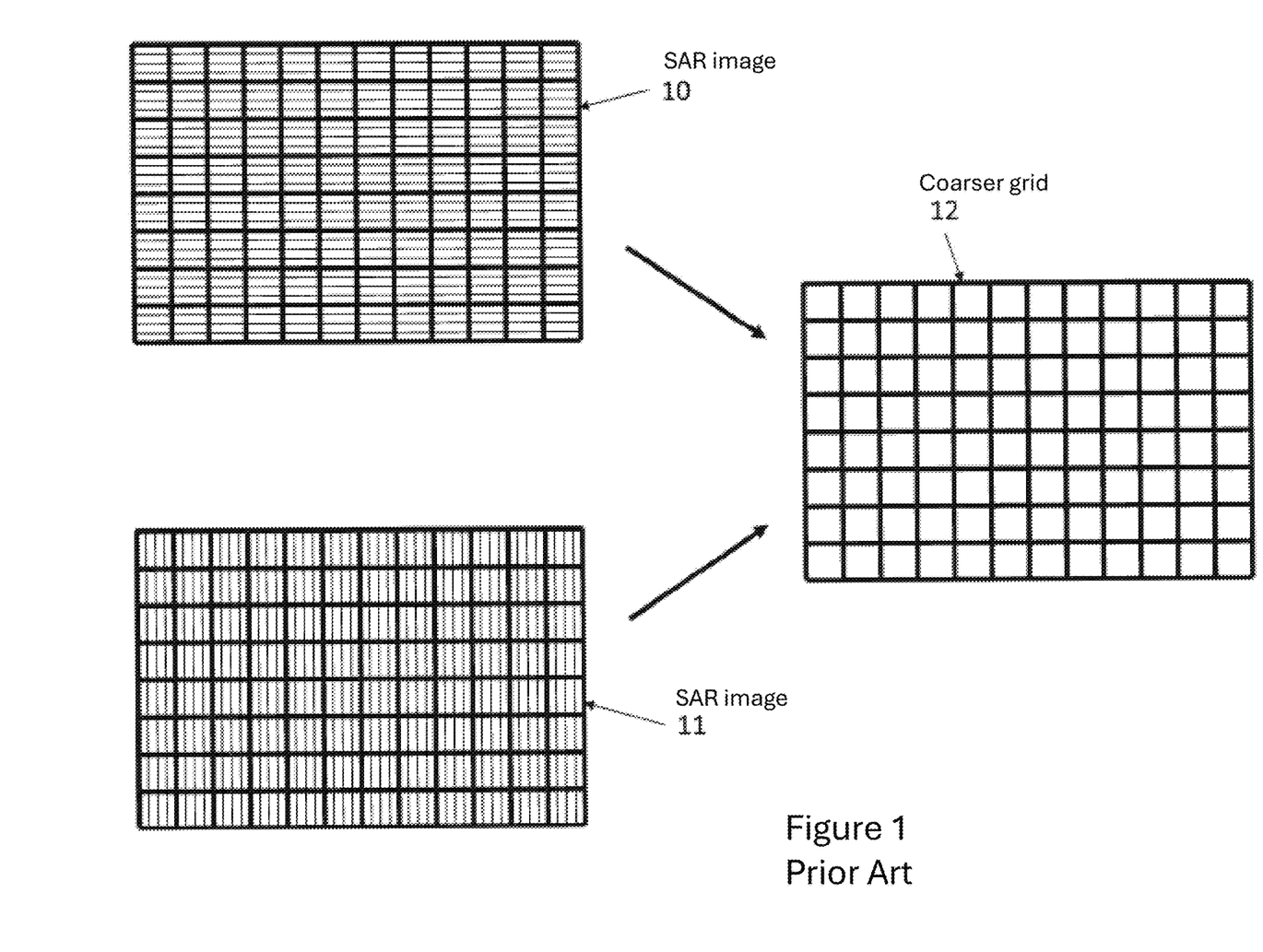
FIG. 1 shows singlelook and multilook spatial resolutions according to the prior art.

FIG. 1 shows singlelook and multilook spatial resolutions according to the prior art.

FIG. 1 shows spatial properties of SAR image data. Individual spatial resolution cell areas are highlighted via the bold lines. It can be seen that the SAR image data consists of two main types of image. One image 10 comprises look information in one direction and the second image 11 comprises look information in a second direction perpendicular to the first direction.

Interferometric phase and tomographic information is retrieved from multiple SAR images 10, 11 of the same area. Alternatively, the detected intensity information of singlelook resolution cell sizes from the SAR images 10, 11 can be averaged spatially or in frequency domain towards multilooked information accordingly on a coarser grid 12 which can end up in a symmetric resolution in along and across track direction. This coarser grid 12 allows for an increased spatial resolution area size.

Figure 2:
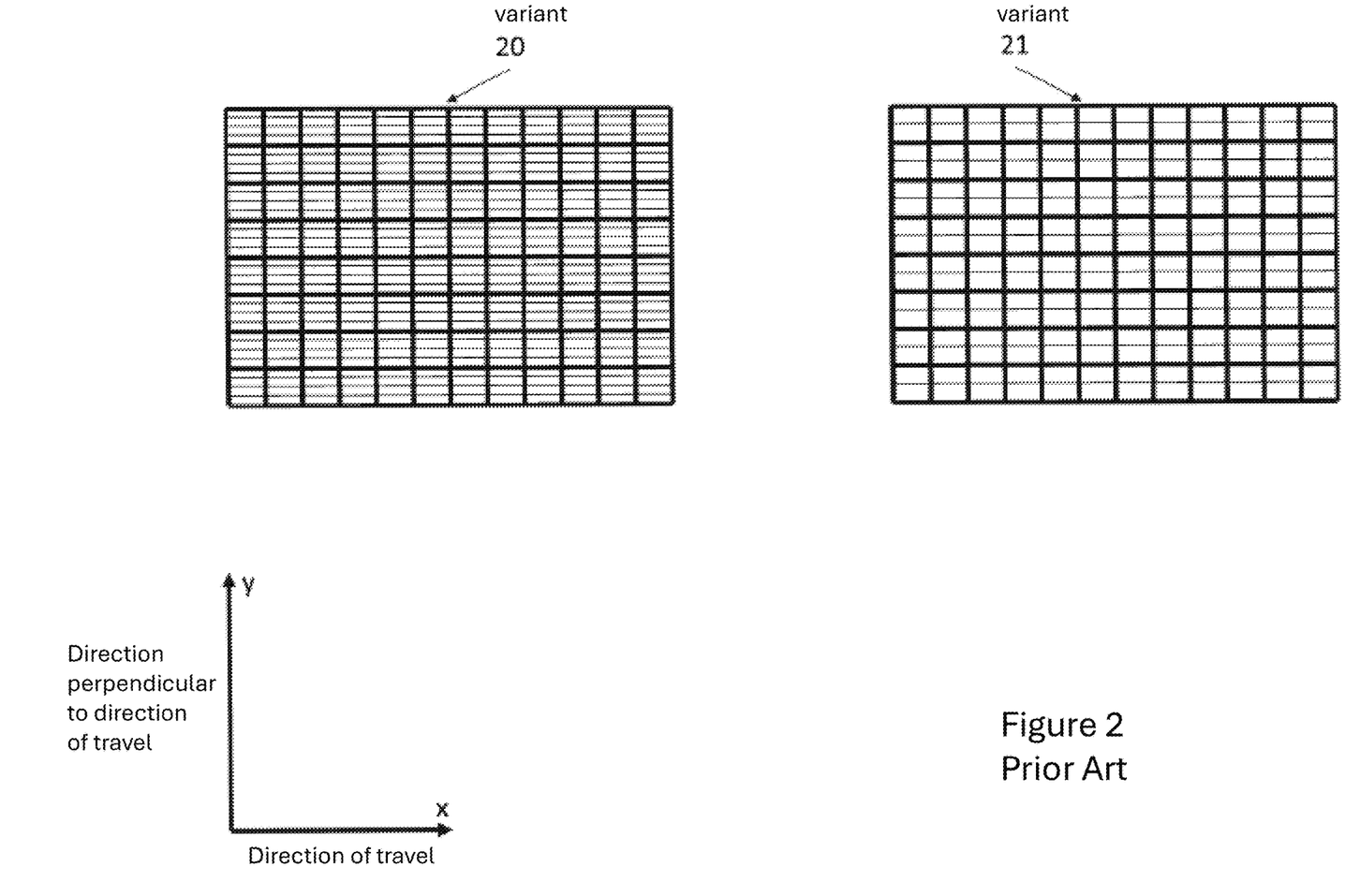
FIG. 2 shows two examples of spatial across track resolution of SAR age data according to the prior art.

FIG. 2 shows a two examples of spatial across track resolution of SAR image data according to the prior art.

FIG. 2 shows the instrument resource driven and image performance relevant single look resolution cell sizes that can be achieved with the same SAR mode and number of looks where only the initial single look range bandwidth is adapted by a factor of two. In prior art, the x direction relates to the direction of travel of the SAR instrument and the y direction relates to the direction perpendicular to the direction of travel.

FIG. 2 shows two variants 20, 21 of spatial resolution cell size, One variant 20 shows improved spatial resolution that allows for four looks with reduced NESZ while the second variant 21 shows coarse spatial resolution for two looks and improved NESZ. Both the spatial resolution and the NESZ contribute to the radiometric resolution of the variants 20, 21.

The presently claimed invention balances these two variants according to the mission the SAR instrument is undertaking. In the embodiments described below, the SAR instrument is airborne but in some embodiments, it may be spaceborne.

Figure 3:
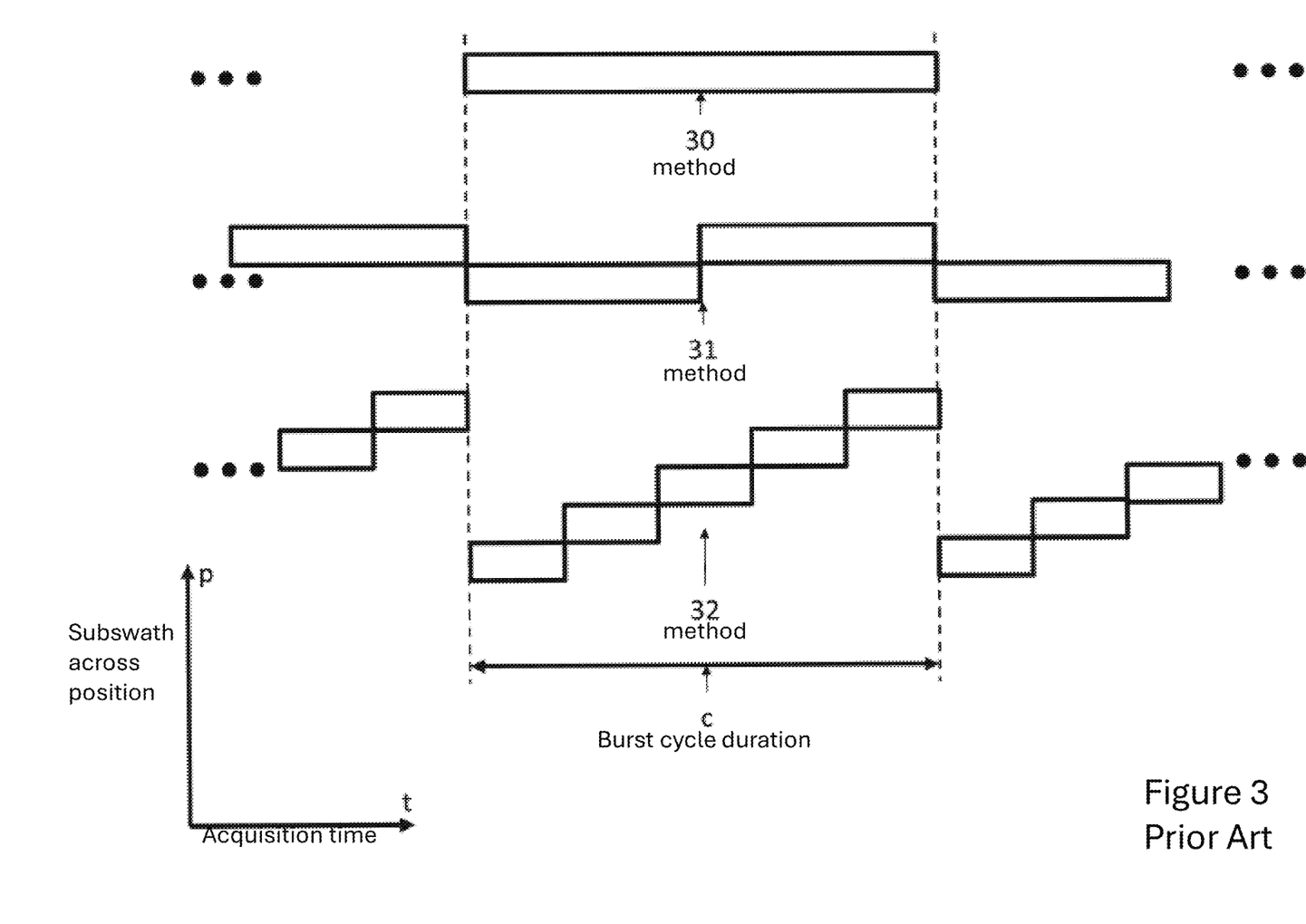
FIG. 3 shows methods of acquiring subswaths according to the prior art.

FIG. 3 shows methods of acquiring subswaths according to the prior art.

FIG. 3 shows general degrees of freedom for ScanSAR or TOPS modes known in the prior art that are used for balancing along track spatial resolution. Spatial resolution improves with increasing the burst length of each subswath but this must be balanced with the number of subswaths and therefore, the across track swath width which can be defined as the total area covered by all sub swaths.

In FIGS. 3 to 6, t is representative of the acquisition time, p is representative of the subswath across position and c is representative of a single burst cycle duration. In some embodiments of the present invention, there may be multiple burst cycles.

One method 30 of acquiring subswaths comprises one single acquisition burst duration in the burst cycle c. This is known in the prior art as stripmap mode. This allows for a high spatial resolution but in turn, the across track width is small A second method 31 shows an extended burst, wherein the burst cycle c is split into two equal burst durations with each burst acquiring one subswath.

A third method 32 shows the burst cycle c split into five equal burst durations. This allows for a large across track width at the expense of spatial along track resolution.

Figure 4:
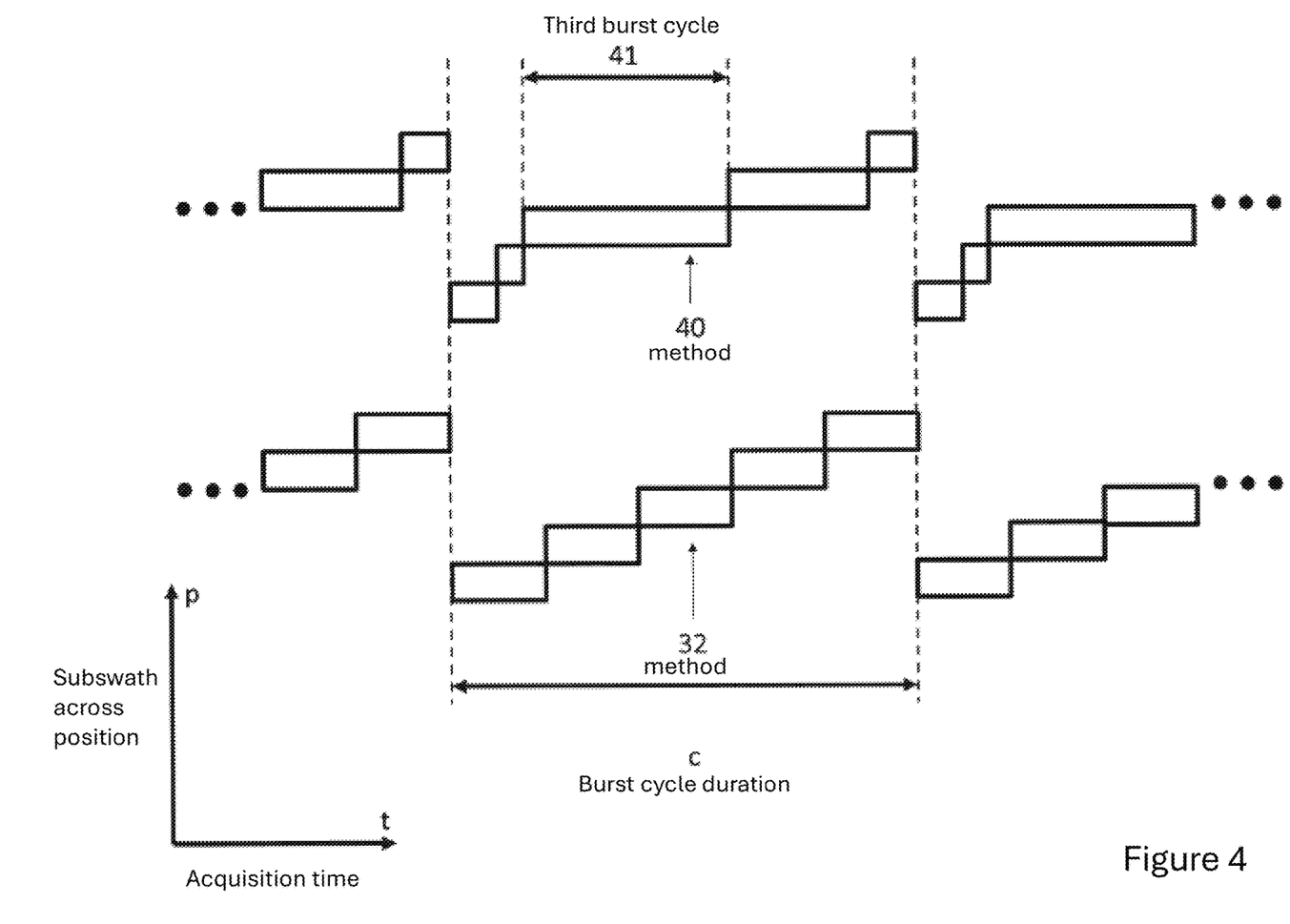
FIG. 4 shows a first method of acquiring subswaths according to an embodiment as described herein.

FIG. 4 shows a first method of acquiring subswaths according to an embodiment as described herein.

Figure 5:
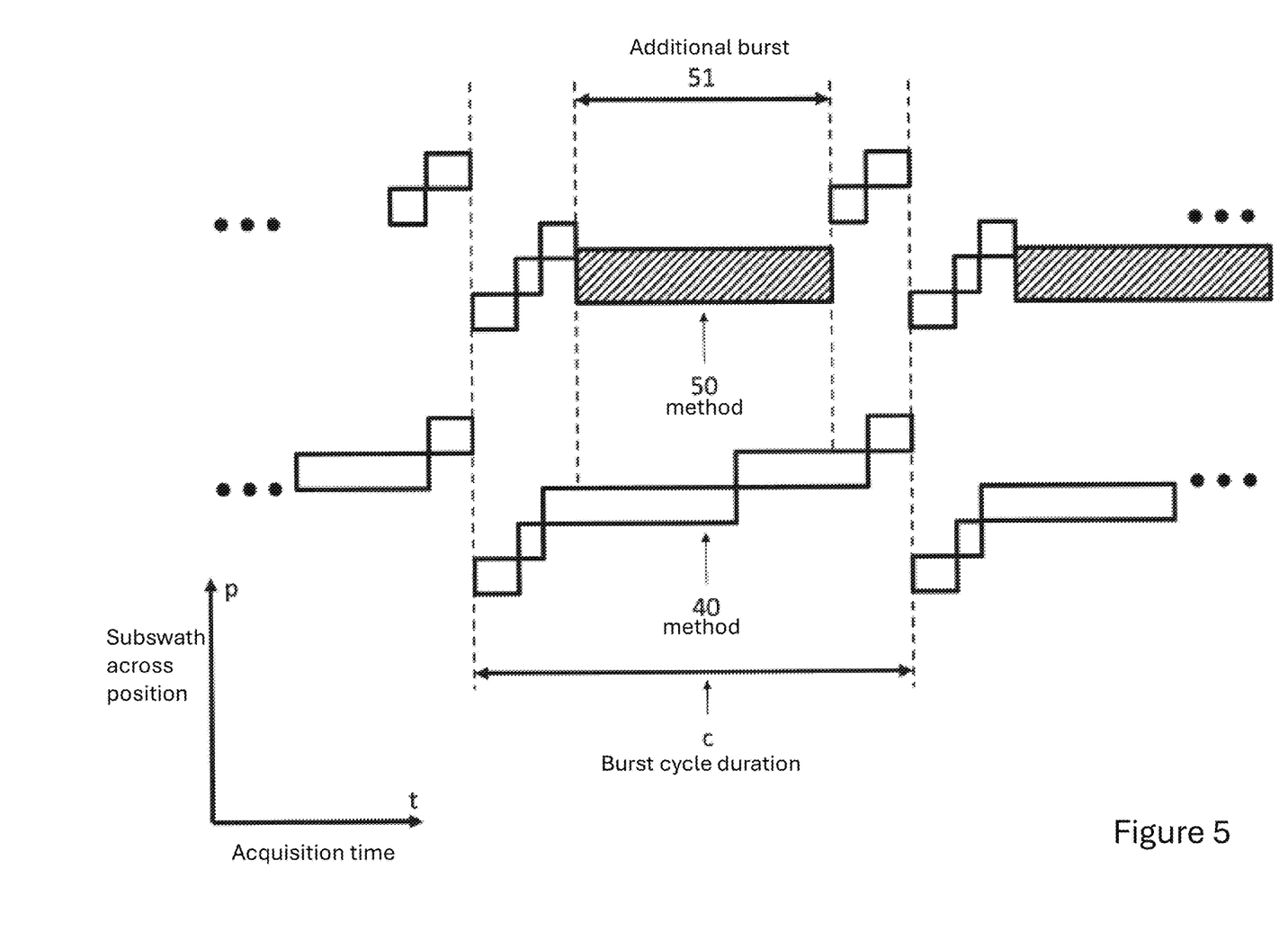
FIG. 5 shows a second method of acquiring subswaths according to an embodiment as described herein.
Figure 6:
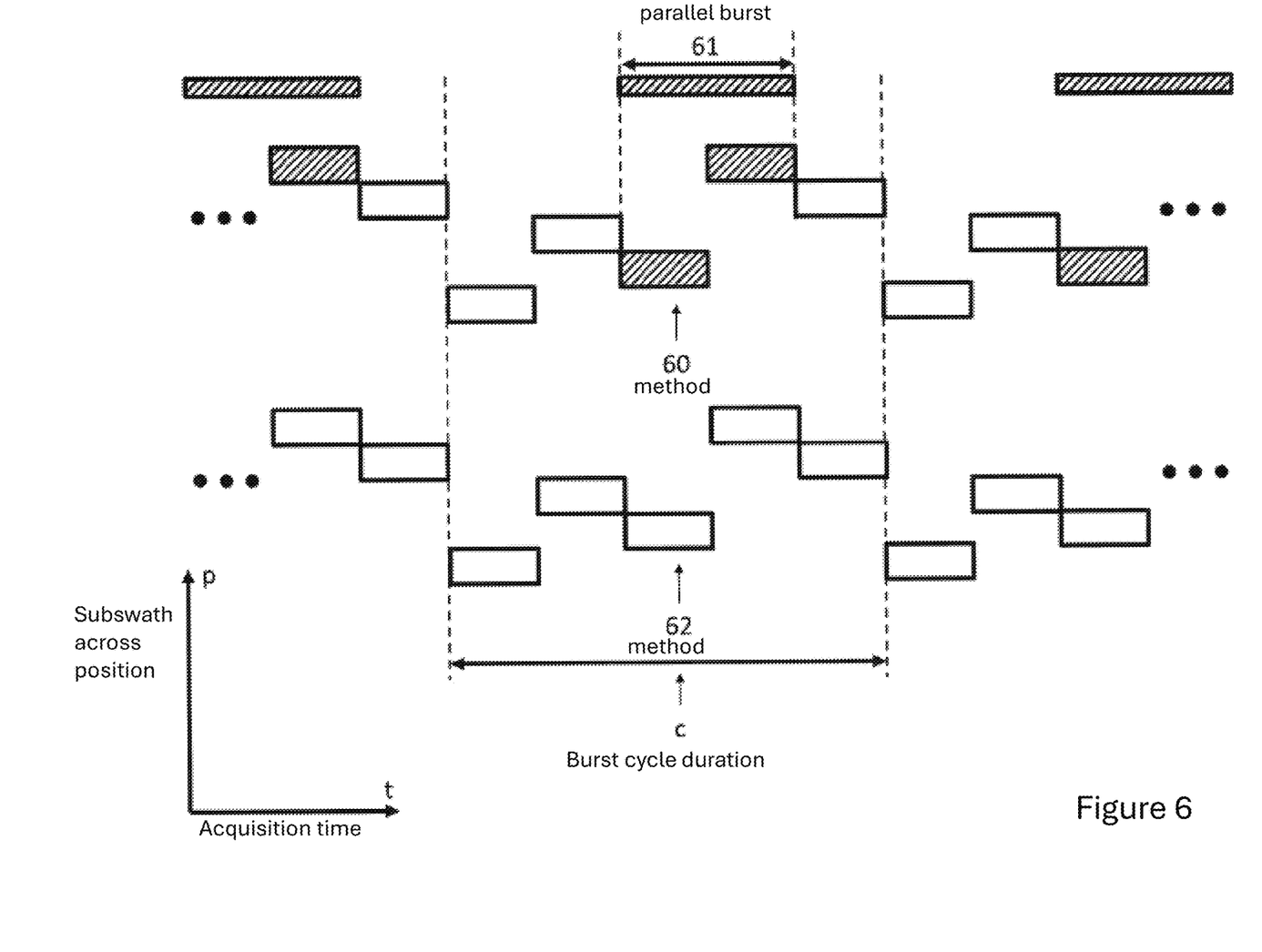
FIG. 6 shows a third method and a fourth method of acquiring subswaths according to embodiments as described herein.

The present invention shown in the embodiments of FIGS. 4 to 6 combine at least two sets of resolution and/or sensitivity data and distribute ScanSAR/TOPS burst durations accordingly.

FIGS. 4 to 6 additional use burst cycles that can be acquired with a given instrument architecture. The methods shown in FIGS. 4 to 6 can be undertaken by an airborne SAR instrument with an acquiring unit configured to acquire the SAR images and a processor unit configured to adjust the ScanSAR/TOPS burst durations and construct an SAR image from the resultant acquisitions.

Furthermore, dependent on the airborne SAR instrument architecture, single or multiple azimuth phase centres as well as ScanSAR or TOPS can be used which can provide optimal performance for the architecture regarded and the mission the airborne SAR instrument is undertaking.

The novel method 40 shown in FIG. 4 depicts the rebalancing of one of the resolution cell area contributing factors by extending the third 41 and fourth bursts of the burst cycle c while shortening the first, second and fifth bursts. Any number of the bursts may be extended or shortened and any one of the bursts can be extended or shortened according to the mission the airborne SAR instrument is undertaking.

This may also allow for the across track resolution being balanced against NESZ by adjusting RF bandwidth as well as the acquisition burst durations of each of the subswaths.

The novel method 40 of FIG. 4 allows for the improvement of the spatial resolution area in combination with the NESZ while still maintaining the total swath area of methods known in the prior art 32. This may lead to a more optimal result than can be achieved with state of the art burst durations allocated for achieving the same along track resolution for all subswaths.

FIG. 5 shows a second method of acquiring subswaths according to an embodiment as described herein.

FIG. 5 shows the difference between the first method 40 and the second method 50. The second method 50 is preferable for an operational scenario for repeated, i.e. global, acquisition with interferometric spectral overlap. Resultantly, in each pass of the airborne SAR instrument, the synthetic aperture position in space needs to be repeated according to the burst cycle c position. For an additional acquisition of at least one of the subswaths, one or two neighbouring burst durations are reduced for inserting an additional subswath acquisition which can be positioned with its individual width anywhere within the across and along track access range of the instrument. In this embodiment, the third and fourth burst durations are replaced with three burst durations. The third and fourth burst durations from the first method 40 are shortened and split. An additional burst 51 is then inserted into the gap created by the split. This additional burst 51 allows for acquisition of the two subswaths simultaneously by changing the antenna beam direction from pulse to pulse. This may be referred to as the pulse repetition interval.

It can be seen that the additional burst 51 achieves a second acquisition of the second and third subswaths but the additional burst 51 may achieve a second acquisition of any of the subswaths and any number of the subswaths. The additional burst 51 may also be placed at any point in the burst cycle c and may be of any length.

The shortened subswaths within the second method 50 still contain SAR image data of the corresponding subswaths but with a reduced spatial along track resolution.

FIG. 6 shows a third method and a fourth method of acquiring subswaths according to embodiments as described herein.

The third method 60 shows a burst cycle c containing a parallel burst 61. The parallel burst 61 is a Beam-Switch Wide-Swath, BSWS, simultaneous acquisition of an additional subswath which is extended over two bursts of a burst cycle c. This is achieved by adjusting the subswath acquisition sequence so that the airborne SAR instrument is able to continuously access the additional parallel burst 61 with the pulse repetition frequency (PRF) and transmit rank boundaries being met. The parallel burst 61 in the third method 60 may be placed anywhere within a burst cycle c and be parallel to the acquisition burst durations of any number of subswathes. Furthermore, in some embodiments, there is both a parallel burst 61 and an additional burst 51 as described in relation to FIG. 5.

The fourth method 62 shows the third method 60 without the parallel burst 61.

No doubt many other effective alternatives will occur to the skilled person. It will be understood that the invention is not limited to the described embodiments and encompasses modifications apparent to those skilled in the art and lying within the scope of the claims appended hereto.

The invention claimed is:

1. A method for operating a synthetic aperture radar, SAR, mode, in an SAR instrument, wherein the method comprises the steps of:
  acquiring at least one subswath positioned in an across track direction of a movement of the SAR instrument, wherein the at least one subswath is acquired at a predetermined radio frequency bandwidth;
  adjusting one or more of (a) the predetermined radio frequency bandwidth, (b) a number of parallel simultaneous subswaths and (c) an inserted burst duration for a further subswath based upon a predetermined parameter; and
  constructing an SAR image based on the acquired at least one subswath.

2. The method of claim 1, wherein the predetermined parameter is a subswath geometry and/or a spatial resolution and/or a radiometric resolution and/or a noise equivalent sigma zero, NESZ, and/or a polarization.

3. The method of claim 2, further comprising adjusting the radio frequency bandwidth during acquisition of the at least one subswath, wherein the adjustment is configured to alter the spatial resolution and/or the NESZ of the constructed SAR image.

4. The method of claim 2, further comprising adjusting the radio frequency bandwidth of the SAR instrument during acquisition of the at least one subswath, wherein the adjustment is configured to alter the NESZ of the constructed SAR image.

5. The method of claim 1, further comprising simultaneously acquiring a plurality of subswaths.

6. The method of claim 5, wherein the plurality of subswaths are acquired by Beam Switch Wide Swath, BSWS, with or without digital beamforming, DBF.

7. The method of claim 6, wherein the digital beamforming comprises multiple receive sub-apertures in azimuth, MAPS, and/or coherent summation of signals from the sub-apertures in one column into one single signal, ScoRe.

8. The method of claim 5, further comprising acquiring a plurality of subswaths simultaneously by changing an antenna beam direction of the SAR instrument between a first pulse of the SAR instrument and a second pulse of the SAR instrument and/or transmit in the plurality of subswaths simultaneously.

9. The method of claim 8, further comprising simultaneously acquiring a plurality of the plurality of subswaths by using a plurality of SAR instrument antenna beams.

10. The method of claim 1, further comprising adjusting an average ground velocity of the acquisition of the at least one subswath.

11. The method of claim 1, further comprising roll steering the SAR instrument.

12. The method of claim 1, wherein the at least one subswath is acquired in an along track interferometric, ATI, ground moving target indication, GMTI, mode and/or a single, dual or quad polarization and/or vessel detection mode.

13. The method of claim 1, wherein the SAR instrument comprises a processing unit, and wherein the processing unit comprises a computer program suitable to execute the method.

14. A SAR instrument comprising:
  an acquisition unit configured to acquire at least one subswath positioned in an across track direction of a movement of the SAR instrument, wherein the at least one subswath is acquired at a predetermined radio frequency bandwidth; and
  a processing unit configured to adjust one or more of (a) the predetermined radio frequency bandwidth, (b) a number of parallel simultaneous subswaths and (c) an inserted burst duration for a further subswath based upon a predetermined parameter and configured to construct an SAR image based on the acquired at least one subswath.

15. The SAR instrument of claim 14, further comprising planar phased array antenna and/or a reflect array and/or a reflector and/or a horn antenna structure.

16. The method of claim 1, wherein adjusting one or more of (a) the predetermined radio frequency bandwidth, (b) a number of parallel simultaneous subswaths and (c) an inserted burst duration for a further subswath based upon a predetermined parameter comprises adjusting at least two of (a), (b) and (c).

17. The method of claim 1, wherein adjusting one or more of (a) the predetermined radio frequency bandwidth, (b) a number of parallel simultaneous subswaths and (c) an inserted burst duration for a further subswath based upon a predetermined parameter comprises adjusting each of (a), (b) and (c).

18. The SAR instrument of claim 14, wherein the processing unit is configured to adjust at least two of (a), (b) and (c).

19. The SAR instrument of claim 14, wherein the processing unit is configured to adjust each of (a), (b) and (c).

\* \* \* \* \*